July 29, 1952  P. L. DUNCAN  2,605,012
CABLE OUTLET BOX LOCK
Filed March 6, 1950
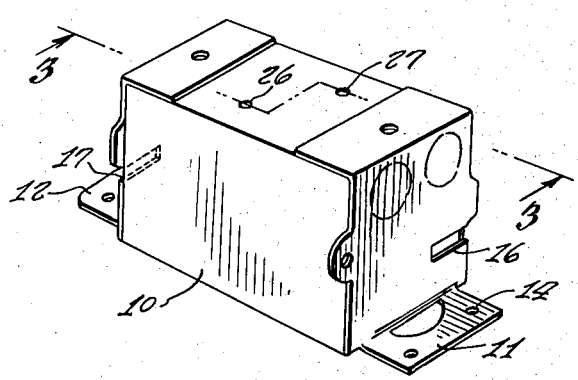
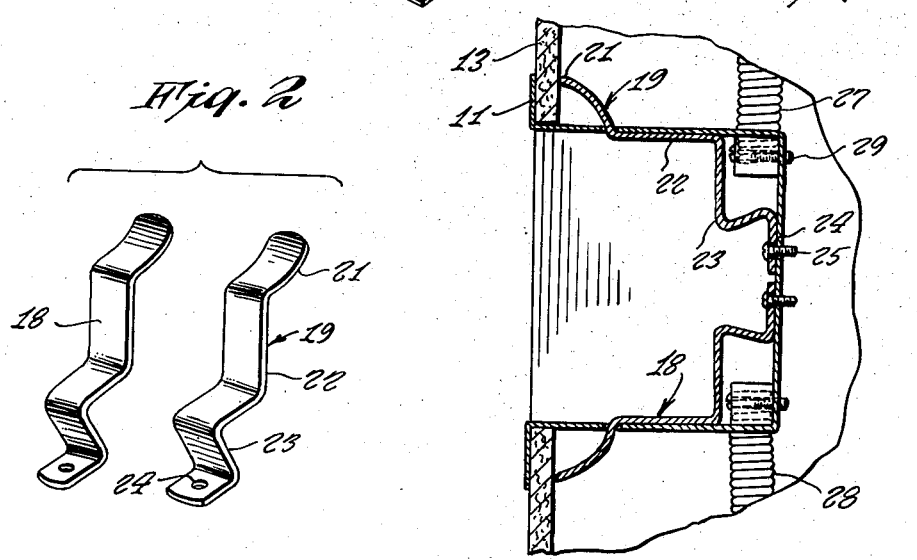
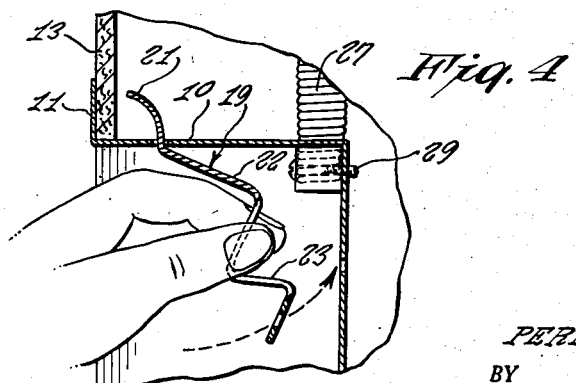
INVENTOR.
PERRY L. DUNCAN
BY
Carl Miller
ATTORNEY Patented July 29, 1952

2,605,012

UNITED STATES PATENT OFFICE 2,605,012

CABLE OUTLET BOX LOCK

Perry L. Duncan, Collegeboro, Ga.

Application March 6, 1950, Serial No. 147,794

1 Claim. (Cl. 220—3.6)

This invention relates to a cable outlet box lock.

It is an object of the present invention to provide a cable outlet box lock which makes it possible to lock in place an outlet box in the walls that will not take screws such as sheet rock, plaster and so forth.

Other objects of the present invention are to provide an outlet box lock which is of simple construction, adapted to be easily fitted in the box and wherein the attaching screws for the lock parts can be made readily accessible and easily extended into the box to effect the locking of the box to the wall, has a minimum number of parts, and efficient in operation.

For other objects and for a better understanding of the invention, reference may be had to the following detailed description taken in connection with the accompanying drawing, in which Fig. 1 is a perspective view of the outlet box formed to receive the locking elements of the present invention.

Fig. 2 is a collective perspective view of the locking elements.

Fig. 3 is a vertical sectional view of the box shown in Fig. 1 taken on line 3—3 thereof.

Fig. 4 is a fragmentary sectional view of the box illustrating the manner in which one of the locking elements is secured in place.

Referring now to the figures, 10 represents an outlet box having outwardly extended flanges 11 and 12. These flanges will engage with the front face of a wall piece in the manner as shown in Fig. 3. If the wall piece, as indicated at 13, is of sheet rock, plaster and such as not to receive and retain screws which may be passed through openings 14 in the flanges other means must be provided to fix the box within the wall.

Accordingly, the ends of the box are provided with slots 16 and 17 into which locking elements 18 and 19 may be extended. As shown in Fig. 3, these locking elements pass through the slots so that end portions 21 of the same will engage with the back face of the wall piece 13. Each locking element has a straight portion 22 which will lie flush with the end wall of the box in the manner as shown in Fig. 3. From this straight portion 22 there extends into the box an angle or double bent portion 23 which has a hole 24 into which screws 25 can be passed for engagement with thread openings 26 and 27 respectively of the back of the box.

Into the box can be extended cables 27 and 28 that can be respectively made secure by screws 29. These cables include casings or armor tubing and can be passed into the box by removing detachable plates provided in the box in a well known manner. When the locking elements are fixed to the back of the box, the box is made secure to the wall piece 13.

To remove the outlet, the locking elements 18 and 19 can be readily released by removing the screws 25. The inner ends of the same will be pivoted inwardly and the end portions 21 drawn through the slots in the ends of the box.

While various changes may be made in the detail construction, it shall be understood that such changes shall be within the spirit and scope of the present invention as defined by the appended claim.

Having thus set forth and disclosed the nature of my invention, what is claimed is:

In a cable outlet box, a main box portion having flanges on the outer face thereof adapted to engage with a wall face, said box portion having opposing slots therein, and opposing locking elements having portions adapted to be extended through the slots for engagement with the rear face of a wall piece and means for securing the locking elements when in place to the interior of the box portion, and each of said locking elements having a straight portion adapted to lie flush against the side of the box portion extending into a second straight portion disposed substantially parallel to and spaced apart from the rear wall of said box, the said second straight portion extending into a rearwardly bent portion towards said rear wall of the box and terminating into a third straight portion engageable with the rear wall of said box, and said securing means comprising screws extendable through the third straight portion of the locking element.

PERRY L. DUNCAN.

REFERENCES CITED

The following references are of record in the file of this patent:

UNITED STATES PATENTS

| Number | Name | Date |
|---|---|---|
| 1,793,187 | Neall | Feb. 17, 1931 |
| 2,063,923 | Gries | Dec. 15, 1936 |
| 2,233,731 | Budnick | Mar. 4, 1941 |